United States Patent [19]

Kamiyama et al.

[11] Patent Number: 5,003,469
[45] Date of Patent: Mar. 26, 1991

[54] METHOD AND APPARATUS FOR PROCESSING DATA IN A DECENTRALIZED PROCESSING SYSTEM

[75] Inventors: Akihiko Kamiyama, Yokohama; Katsumi Kawano, Fuchu; Kinji Mori, Yokohama, all of Japan

[73] Assignees: Hitachi, Ltd., Tokyo; Hitachi Control Systems, Inc., Hitachi, both of Japan

[21] Appl. No.: 152,996

[22] Filed: Feb. 8, 1988

[30] Foreign Application Priority Data

Mar. 16, 1987 [JP] Japan .................................. 62-60847

[51] Int. Cl.[5] ..................... G06F 12/02; G06F 13/00
[52] U.S. Cl. .................................. 364/200; 364/246; 364/245.1; 364/245.2
[58] Field of Search ............................ 364/200, 900; 365/230.01

[56] References Cited

U.S. PATENT DOCUMENTS

| | | | |
|---|---|---|---|
| 3,678,462 | 7/1972 | Condon et al. | 364/200 |
| 3,754,218 | 8/1973 | Hatta et al. | 364/200 |
| 3,810,109 | 5/1974 | Morris et al. | 364/200 |
| 3,824,561 | 7/1974 | Wolf | 364/200 |
| 4,075,694 | 2/1978 | Ericsson | 364/200 |
| 4,280,176 | 7/1981 | Tan | 364/200 |
| 4,499,539 | 2/1985 | Vosacek | 364/200 |
| 4,523,276 | 6/1985 | Maejima et al. | 364/200 |

OTHER PUBLICATIONS

Fundamentals of Data Structures in Pascal, p. 34, 1984.

Primary Examiner—Michael R. Fleming
Assistant Examiner—Gopal C. Ray
Attorney, Agent, or Firm—Antonelli, Terry, Stout & Kraus

[57] ABSTRACT

In a decentralized processing system comprising a multiplicity of processors linked together through a transmission medium, a method of processing data of variable length that can be relocated in the transmission medium wherein each processor stores in a blank area of its own memory the data received from the transmission medium using information that indicates the size of the data and location of the data stored in the processor.

12 Claims, 9 Drawing Sheets

FIG. 7

| | IDENTIFYING CODE | HEAD ADDRESS | TAIL ADDRESS | SIZE OF BLANK AREA | HEAD ADDRESS BEFORE RELOCATION |
|---|---|---|---|---|---|
| 1 | -1 | low | low | $d_1$ | |
| | | | | | |
| i | $fc_i$ | $s_i$ | $e_i$ | $d_i$ | $os_i$ |
| i+1 | | | | | |
| n | -1 | high | high | -1 | |

| | IDENTIFYING CODE | HEAD ADDRESS |
|---|---|---|
| 1 | | |
| | | |
| n | | |

31

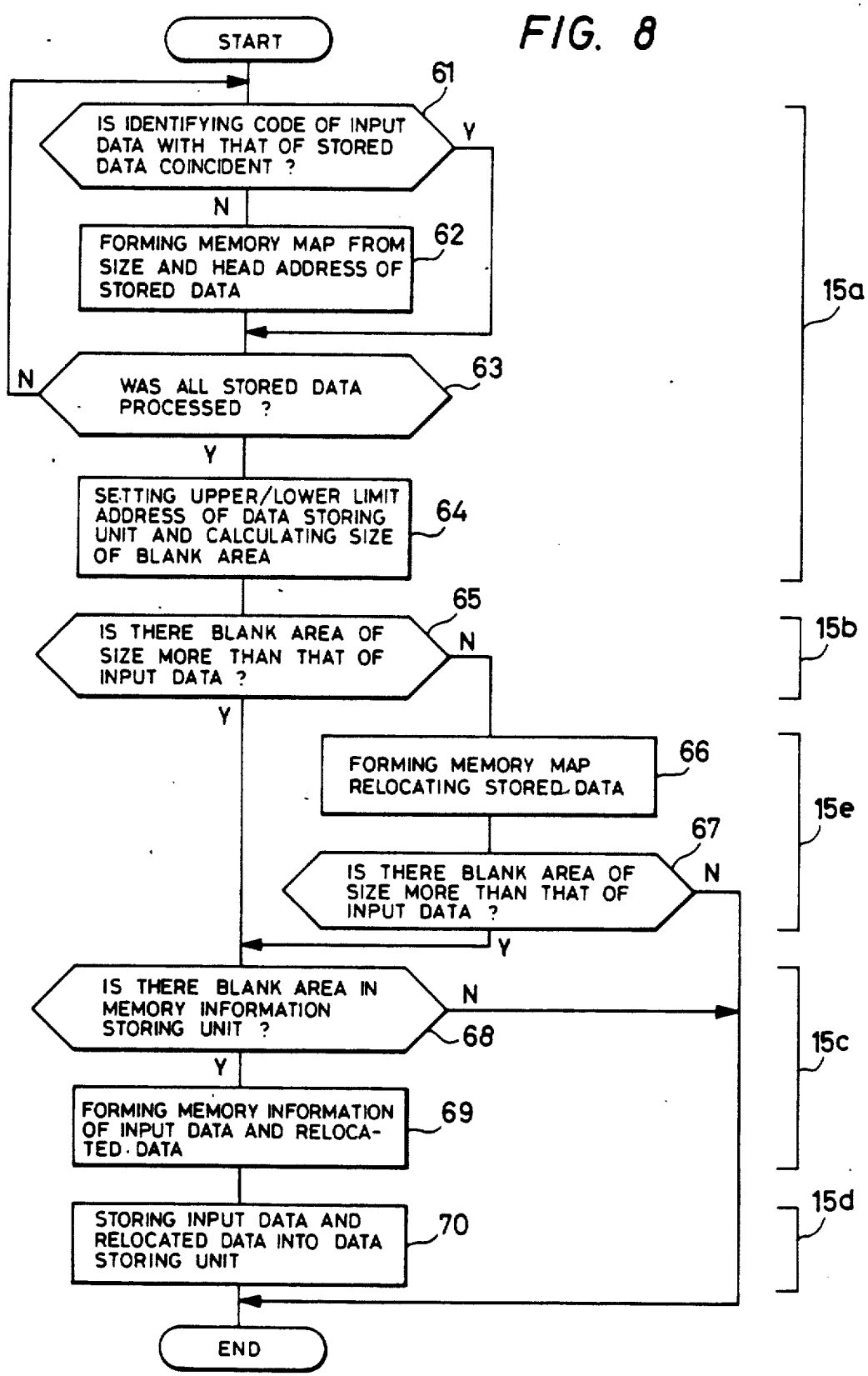

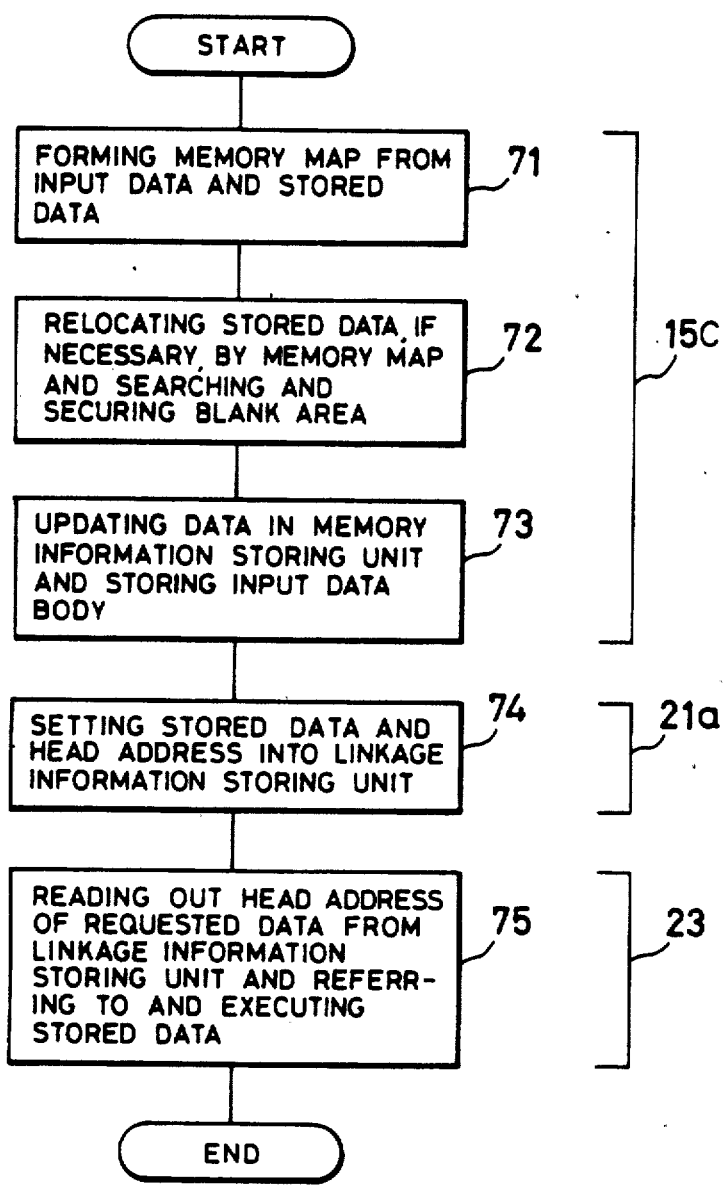

METHOD AND APPARATUS FOR PROCESSING DATA IN A DECENTRALIZED PROCESSING SYSTEM

BACKGROUND OF THE INVENTION

1. Field of the Invention

The present invention relates to a method and an apparatus for processing on-line data in a decentralized processing system consisting of a multiplicity of processors linked through a transmission medium.

2. Description of the Prior Art

A system for processing on-line data in a decentralized processing system as described in Japanese Patent Laid-Open No. 146361/1982. That system includes a transmission control processor which is connected to a processor and sends the data that is required by the processor to the data area on a transmission medium with the content code thereof as a key. The program in the processor stores the data that is sent in the data area. However, the size and head address of the data area must be determined at the time of preparing the program.

If data of an increased size is directly stored by the program, therefore, other areas positioned just behind the above data are destroyed unless the following procedures are taken:

(1) Correction of the data areas only is not sufficient when the data is directly referred to by a head address of the program. Therefore, the processor for developing the program must link again the data area and the program that makes reference to the data, and must load them at one time onto a processor that needs them under an off-line condition.

(2) To effect the above linkage, the processor for developing the program manages the memory information specific to the processor that receives the program, and further manages the program and the data.

(3) The processor for developing the program designates a loading address so that the address at the time of linkage agrees with the address at the time of loading.

According to the above prior art, however, there is no attempt to dynamically cope with the data of variable lengths on the transmission medium, and problems arise as described below.

(1) If data having an increased size is directly stored by the program, other areas arranged just behind the data are destroyed and are not referred to.

(2) The data are not stored under an on-line condition, and the program must be corrected.

(3) The processor for developing the program must manage the memory information specific to the processor, must manage the program and information related to the data that are necessary for developing and correcting the program, and must further manage the loading addresses for designating the processors.

Because of these reasons, the processors could not maintain autonomy to carry out the processing relying solely upon their own internal information without giving instructions to other processors or without being instructed by other processors, making it difficult to maintain flexibility in the maintenance and extension.

SUMMARY OF THE INVENTION

The object of the present invention is to provide a method and an apparatus for processing data in which data of variable length that can be relocated on the transmission medium is stored in an on-line manner autonomously by searching and securing suitable blank areas, in order to preclude the above-mentioned problems inherent in existing on-line data processing systems.

In order to achieve the above object, the present invention provides a method of processing data in which the individual processors process data of variable lengths that can be relocated on the data field in a decentralized processing system that consists of a multiplicity of processors linked through a transmission medium, and having the improvement wherein each of the individual processors has information that indicates the location of the data stored in its own memory, searches the area necessary for storing the data in the memory, and stores the data received from the transmission medium in blank areas of its own memory in an on-line manner in an indirectly referable form by using only the information that represents the location of the data stored in its own processor.

BRIEF DESCRIPTION OF THE DRAWINGS

FIG. 7 is a diagram illustrating a format of the memory map;

FIG. 8 is a flow chart illustrating the flow of the process of the processor in the decentralized processing system according to another embodiment of the present invention;

FIG. 10 is a flow chart illustrating the flow of the process of the data drive system; and FIG. 11 is a diagram illustrating a format of the linkage information storing unit of FIG. 9.

DETAILED DESCRIPTION OF THE PREFERRED EMBODIMENTS

The principle of the invention will now be described.

According to the present invention, a decentralized system consists of a multiplicity of processors that are connected together via a transmission control processor, wherein the data that flows through a transmission medium consists of a content code that indicates the content, an identifying code for identifying the data body, the size of data body and the data body. As for the data required by the processors, the content code has already been registered in advance to the transmission control processor.

Each processor has a buffer for temporarily storing the input data, a data storing unit for storing the data body, and a memory managing unit which manages a memory information storing unit that stores the identifying code, the size of the data area and the head address for the data stored in the data storing unit, which manages the memory in the processor, and which searches and secures a suitable blank area.

The data formed by each of the processors flow in the above-mentioned forms on the transmission medium. The transmission control processor sends to the processor the data that is required by the memory managing unit in the processor with the content code as a key. The processor drives the memory managing unit relying upon the data input to the buffer. The memory managing unit, first, calculates head/tail addresses of the data areas from the information stored in the memory information storing unit. The memory managing unit then prepares a memory map on the data storing unit based upon the head/tail addresses and upper/lower limit addresses (internal data) stored in the data storing unit.

Next, the memory managing unit searches for a blank area greater than the size of the received data from the memory map that is prepared. When there is a suitable blank area, information related to the received data is stored in a blank area in the memory information storing unit. The memory managing unit then stores the data body in the data storing unit with the head address of blank area in the data storing unit as a loading address. That is, since the processor performs the memory management and searches and secures a suitable blank area, other areas are not destroyed even when the size of the input data is changed. In addition, since there is no need for correcting the program for storing the data, it is possible to store on data in the on-line manner. Moreover, the individual processors need not recognize information specific to other processors and are capable of carrying out processing autonomously.

Embodiments of the invention will now be described in detail in conjunction with the accompanying drawings.

Figure 2:
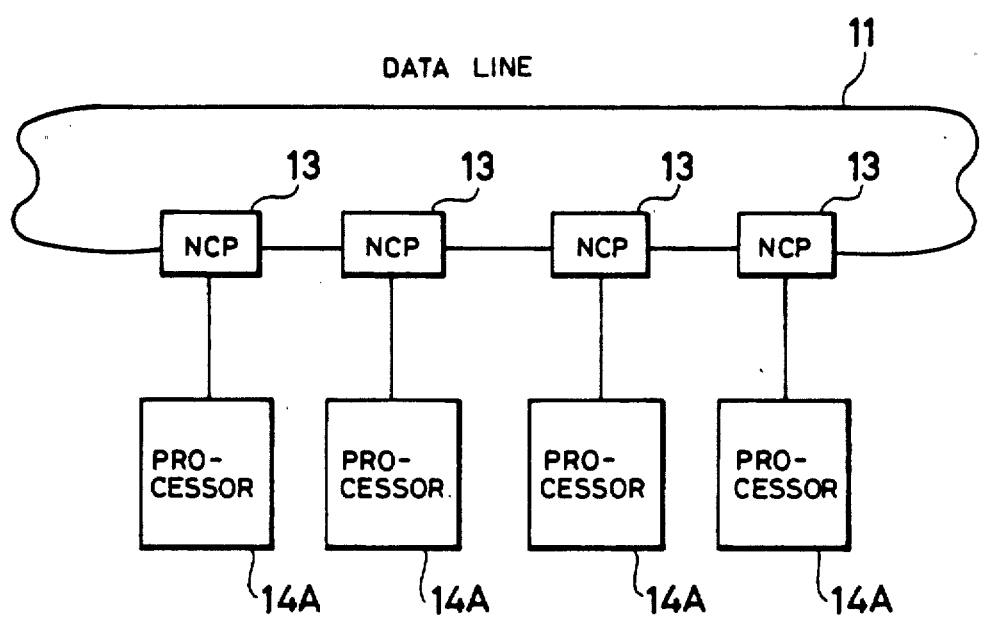
FIG. 2 is a block diagram illustrating the general structure of the decentralized processing system to which the present invention is related.

FIG. 2 is a block diagram which illustrates the general structure of a decentralized processing system for processing data according to an embodiment of the present invention. The decentralized processing system is comprised of a multiplicity of processors 14A that are linked together by a common transmission medium (hereinafter sometimes referred to as data line) 11 via transmission control processors (NCP) 13. The common transmission medium or data line referred to here stands for a medium that carries data of the processors, such as a wired transmission path, memory or wireless path.

Figure 3:
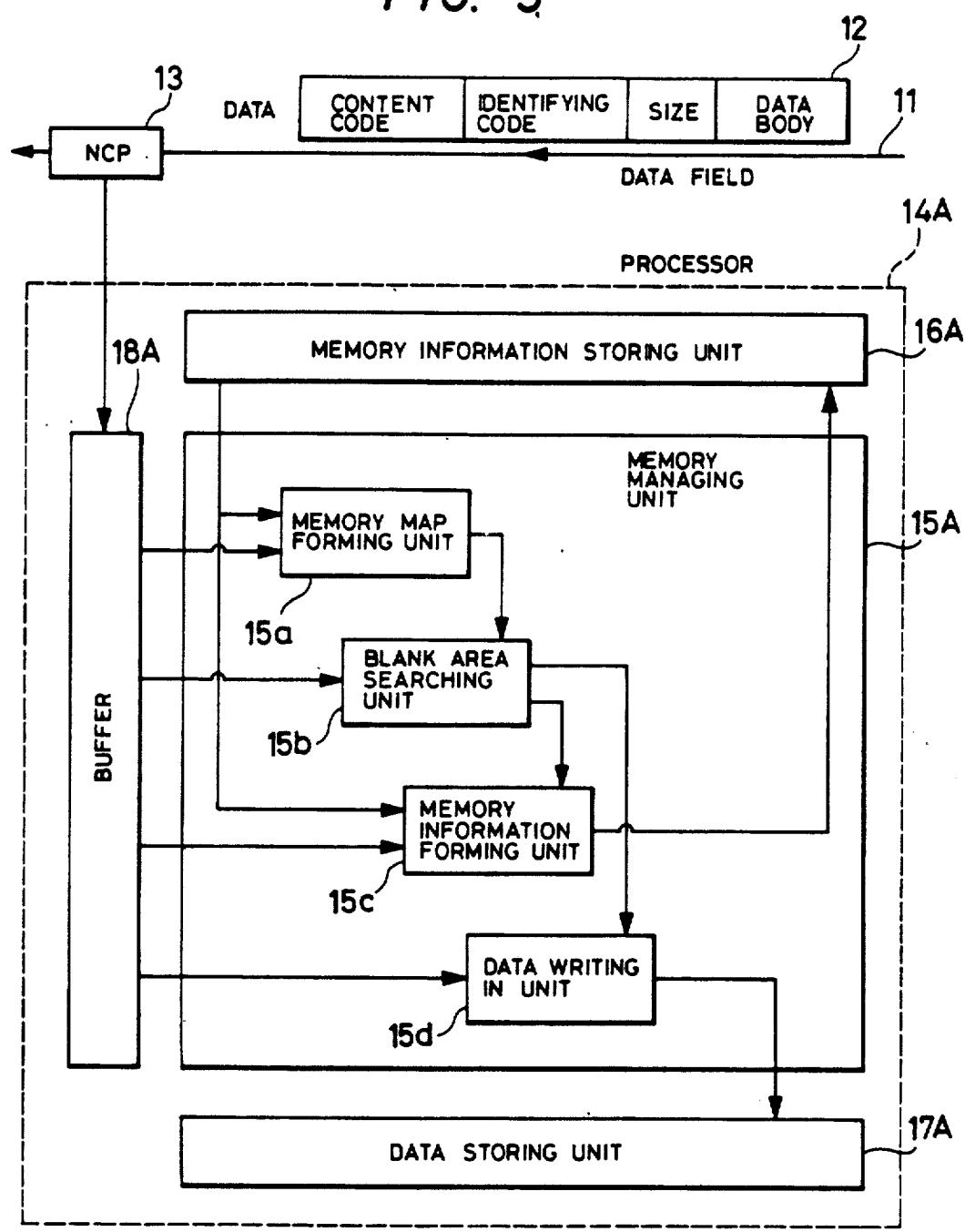
FIG. 3 is a block diagram illustrating the structure of the processor of FIG. 2.

The process carried out by the processors will now be described with reference to FIG. 3. The data 12 flows in the data line 11 in the above-mentioned form. Here, the data body consists of data of variable lengths that can be rearranged, such as ordinary data, primitive program, object program, and load modules that can be rearranged.

A method which uses a code called content code to indicate the content of data will now be described as a method (protocol) of transmitting and receiving data among the processors 14A via the data line 11. It is, of course, allowable to use any other protocol as a method of transmitting and receiving data.

The data 12 on the data line 11 are received by the NCP's 13 connected to the processors 14A. As for the data required by the processors 14A as described above, the content codes have already been registered to the NCP's 13. The NCP's 13 compare the received data with the content codes as keys, and send the received data to the processors 14A as required.

The program in the processor 14A is so constituted as to execute the process with the data as inputs when the data having predetermined content codes are all prepared. This has been closely described in the aforementioned Japanese Patent Laid-Open No. 146361/1982.

The processor 14A drives the memory managing unit 15A in response to the data 12 input to the buffer 18A. Based upon information in the memory information storing unit 16A shown in FIG. 4, the memory managing unit 15A searches and secures a suitable blank area through the process that will be described later, and stores the input data 12 in the data storing unit 17A. The memory managing unit 15A consists of a memory map forming unit 15a, a blank area searching unit 15b, a memory information forming unit 15c, and a data write-in unit 15d.

Figure 1:
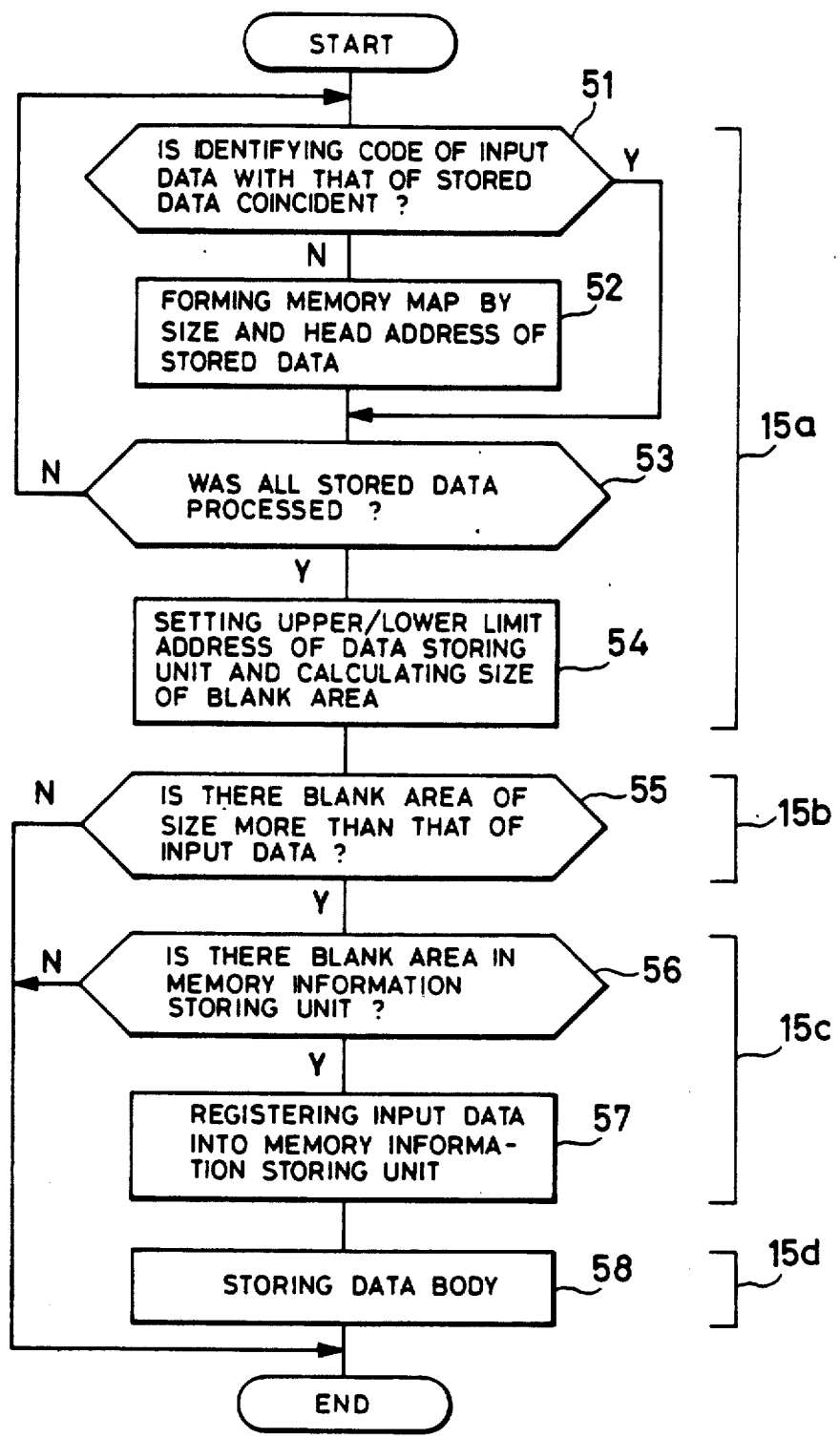
FIG. 1 is a flow chart illustrating the flow of the process of a processor in a decentralized processing system according to an embodiment of the present invention.

FIG. 1 is a flow chart according to which the process is executed by the memory managing unit 15A. The process of memory managing unit 15A will now be described with reference to the flow chart of FIG. 1.

The memory managing unit 15A, first, drives the memory map forming unit 15a which forms a memory map 41A to search for blank area in the data storing unit 17A. FIG. 5 shows a format of the memory map 41A. In the memory information storing unit 16A is stored information related to data that have been stored in the data storing unit 17A in the format shown in FIG. 4.

At the time of preparing the memory map 41A, therefore, it is determined whether the memory information is to be used or not. That is, when the identifying code ID of the input data 12 is the same as that of the data designated by the memory information storing unit 16A, the data designated by the memory information storing unit 16A may be renewed by being overwritten or the like in a step 58 in response to the input of data 12. In such a case, therefore, the procedure proceeds to step 53 without using the memory information (step 51).

When the identifying codes are not in agreement, the memory map 41A is prepared based upon the memory information in compliance with the format of FIG. 5. Here, the tail address is obtained by adding the size to the head address. Sets consisting of identifying codes, head addresses and tail addresses are densely stored starting from the second line of the memory map 41A (step 52). The processes of steps 51 and 52 are effected for all of the data designated by the memory information storing unit 16A (step 53).

The first line of the memory map 41A and the n-th line where the final data is stored correspond to the upper/lower limit addresses (low/high) of the data storing unit 17A. Therefore, a value of, for example, $-1$ is stored in the identifying code and the same value is stored in the head/tail addresses as shown in FIG. 5. Next, the first line up through to the n-th line of the memory map 41A are sorted in ascending order with the head address as a key. Sizes of blank areas are found for the first line through the (n-1)-th line in the memory map 41A. Here, the identifying code, head address, tail address and size of blank area of the i-th line are denoted by $fc_i$, $s_i$, $e_i$ and $d_i$, respectively. The size $d_i$ of blank area just behind the data area of identifying code $fc_i$ is $d_i = s_{i+1} - e_i$. The size of blank area of the n-th line is presumed to be, for example, $-1$ (step 54).

The memory managing unit 15A then drives the blank area searching unit 15b which searches blank area for a size greater than that of the input data 12 based upon the size of input data 12 and memory map 41A. If there is such a blank area, there is obtained a head address thereof, i.e., the tail address of the data area just in front of the blank area. The memory managing unit 15A then drives the memory information forming unit 15c. If there is no such blank area, the processing is finished (step 55).

The memory information forming unit 15c, first, checks whether there is a blank area in the memory information storing unit 16A by which memory information related to the input data 12 can be registered. The stored data whose identifying code is in agreement with that of the input data 12 is deleted, and the area in the memory information storing unit 16A is added to the blank area (step 56). If there is such a blank area, the identifying code, size of the data area and head address are stored in the memory information storing unit 16A for the input data 12. The memory managing unit 15A then drives the data writing-in unit 15d (step 57).

The data writing-in unit 15d stores the data body of input data 12 in the blank area of the data storing unit 17A with the head address as a loading address.

As a modified embodiment, furthermore, the content code may be brought into agreement with the identifying code, and the process based upon the identifying code may be carried out using the content code.

According to the above-mentioned embodiment, the processor manages the memory, and further searches and secures suitable blank area. Therefore, even when the size of the input data is changed dynamically, other areas on the data storing unit are not destroyed. In addition, since there is no need for correcting the program for storing the input data, it is possible to store the data in an on-line manner. Moreover, each processor need not recognize information specific to other processors and can execute processing autonomously.

Therefore, the processors are allowed to store the data in an on-line manner autonomously while searching and securing a suitable blank area, and so the system features improved on-line maintenance and extensibility.

Figure 6:
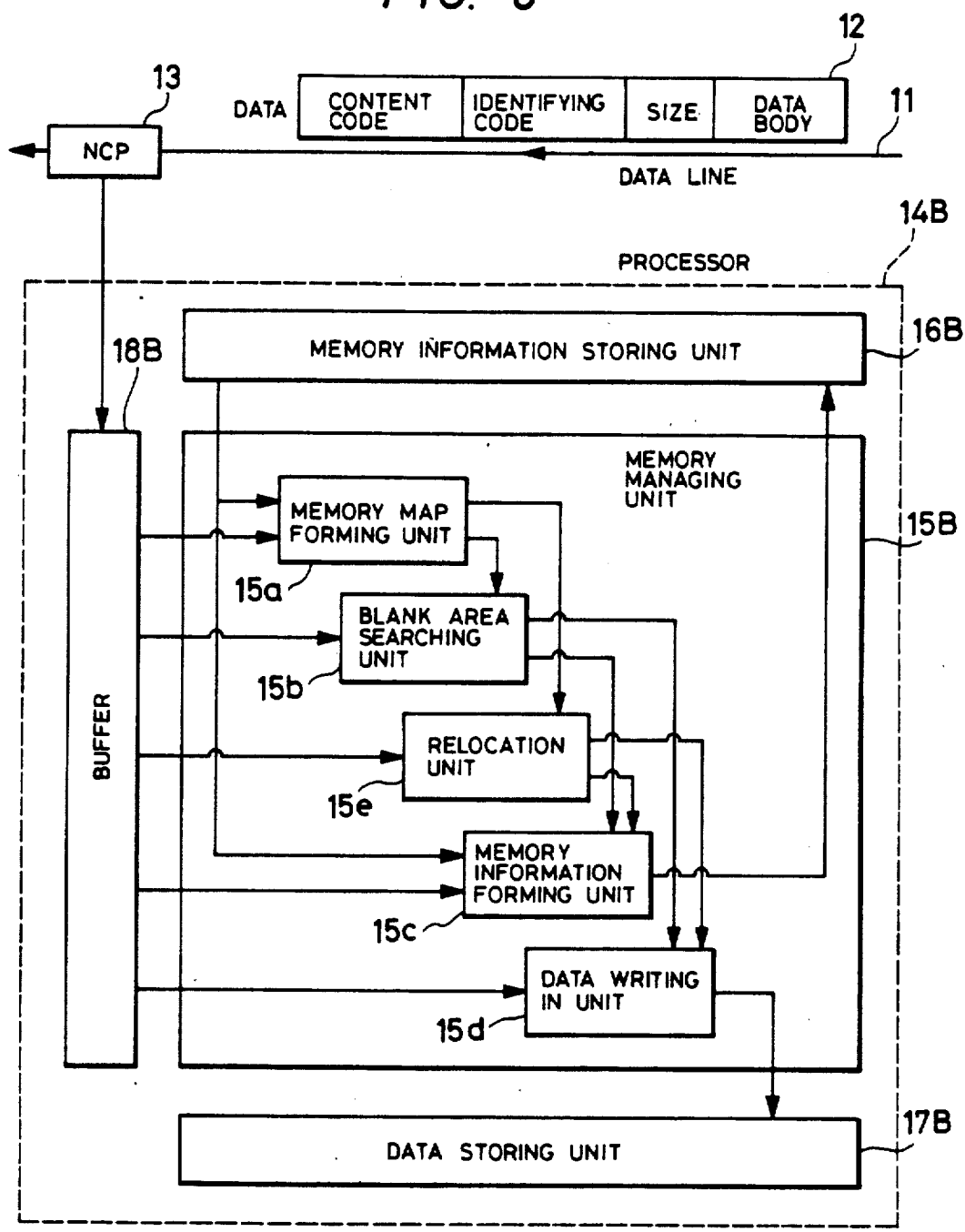
FIG. 6 is a diagram illustrating the structure of the processor according to another embodiment of the present invention.

FIG. 6 illustrates another embodiment of the present invention in which the process is executed by the processors. In FIG. 6, reference numerals 11, 12 and 13 denote the same constituent elements as those of the above-mentioned embodiment, and reference numerals 14B to 18B denote constituent elements that correspond to the constituent elements 14A to 18A. That is, reference numeral 14B denotes a processor. Reference numerals 15B, 16B, 17B and 18B denote, respectively, a memory managing unit, a memory information storing unit, a data storing unit and a buffer that constitute the processor 14B. The program in the processor 14B is so constituted as to execute processing with the data as inputs when the data having predetermined content codes are all prepared. This is the same as in the aforementioned embodiment.

The processor 14B drives the memory managing unit 15B in response to data 12 input to the buffer 18B. Based upon information in the memory information storing unit 16B shown in FIG. 4, the memory managing unit 15B secures a suitable blank area by the process described later and stores the input data 12 in the data storing unit 17B. The memory managing unit 15B consists of a memory map forming unit 15a, a blank area searching unit 15b, a memory information forming unit 15c, a data writing-in unit 15d, and a relocation unit 15e.

FIG. 8 is a flow chart which illustrates the process executed by the memory managing unit 15B. The process of the memory managing unit 15B according to this embodiment will now be described in conjunction with the flow chart of FIG. 8.

The memory managing unit 15B, first, drives the memory map forming unit 15a which forms a memory map 41B (FIG. 7) for locating blank area in the data storing unit 17B as described in the aforementioned embodiment. FIG. 7 shows a format of the memory map 41B. In the memory information storing unit 16B is stored information related to data that have been stored in the data storing unit 17B in the format shown in FIG. 4.

At the time of preparing the memory map 41B, therefore, it is determined whether the memory information is to be used or not. That is, when the identifying code of the input data 12 is the same as that of the data designated by the memory information storing unit 16B, the data designated by the memory information storing unit 16B may be renewed by double-writing or the like in a step 70 in response to the input data 12. In such a case, the procedure proceeds to a step 63 without using the memory information (step 61).

When the identifying codes are not in agreement, the memory map 41B is prepared based upon the memory information in compliance with the format of FIG. 7.

Operations of the steps 64 and 65 are the same as operations of the steps 54 and 55 in the aforementioned embodiment. If there is no blank area, the memory managing unit 15B drives the relocation unit 15e to relocate the stored data in order to check whether the required blank area is obtained or not.

The relocation unit 15e causes the relocation of the stored data to obtain a blank area that is required. First, a memory map 41B is prepared in the case where the stored data are densely arranged in an increasing order on the data storing unit 17B for each of the areas with the head address as a key. In the memory map 41B, the head address of the i-th line, tail address, size of blank area and head address before the relocation are denoted by $s_i$, $e_i$, $d_i$ and $os_i$, and are renewed as follows:

$$os_i = si$$

$$s_i = e_{i-1}$$

$$e_i = e_i - d_{i-1}$$

(where $d_{i-1} \neq 0$, $i = 2, 3, \text{-----}, n-1$)

The initial value of the head address $os_i$ before the relocation at the time of forming the memory map is presumed to be, for example, $-1$.

Thus, with the head address $os_i$ of before the relocation being renewed, the memory information forming unit 15C that will be described later and the data writing-in unit 15d check whether it is an initial value or not, whereby it is recognized whether the data requires relocation or not, and the initial head address is recognized.

Next, the size of blank area is found, and the memory map 41B is formed again in the same manner as the memory map forming unit 15a (step 66). Based upon the reformed map 41B, the blank area is located in the same manner as done by the blank area searching unit 15b. If there is the required blank area, the memory managing unit 15B drives the memory information forming unit 15c so that information related to input data 12 and stored data that require relocation are applied to the memory information storing unit 16B. If there is no such blank area, the process is finished (step 67).

Operation of the memory information forming unit 15c is the same as the operation mentioned in the foregoing embodiment (step 68). Here, if there is the required blank area, the identifying code, size of data area and head address are stored in the memory information storing unit 16B for the input data 12. The above head address is that of a blank area obtained by the blank area searching unit 15b or the relocation unit 15e. Further, if there is stored data that requires relocation, the content of the memory information storing unit 16B is searched with the identifying code as a key. The head address of the area is renewed by the head address in the reconstituted memory map 41B. Then, the memory managing unit 15B drives the data writing-in unit 15d (step 69).

The data writing-in unit 15d writes the input data 12 onto the data storing unit 17B and relocates the stored data when it needs relocation. That is, when there is the stored data that needs relocation, the data in the data storing unit 17B is relocated based upon information in the memory map 41B.

Thereafter, the data body of input data 12 is stored based upon the head address of the blank area on the data storing unit 17B (step 70).

The above-mentioned embodiment can be modified in a manner as described below.

(1) The identifying code of memory map 41B may be used as a line number on the memory information storing unit 16B such that the stored data that needs relocation can be processed at high speeds by the memory information forming unit 15c. Here, however, the first line and the n-th line of memory map 41B are excluded. This makes it possible to simplify the procedure for searching the content of memory information storing unit 16B using the identifying code as a key.

(2) The content code may be brought into agreement with the identifying code to carry out the processing based upon the identifying code using the content code.

According to the above-mentioned embodiment, the processor manages the memory, searches and secures a suitable blank area and, as required, relocates the stored data. Therefore, the blank area is prevented from being further divided into small areas and wasteful blank areas are eliminated, making it possible to store more data in addition to the effects obtained by the aforementioned embodiment.

Therefore, the processor stores the data in an on-line manner autonomously while securing a suitable blank area such that the memory can be effectively utilized, contributing to improving on-line maintenance and extensibility of the system.

Described below is the operation in the case where the data stored by the above-mentioned system is processed relying upon an indirect reference system.

The feature of this data drive system resides in the processor being provided with the aforementioned data writing-in means for data of variable lengths that are independent of each other and are not interfered by each other and that can be relocated, that the processor has information that indicates a head address of the stored data, and that the processor executes the processing with reference to the stored data by the indirect reference system using the above information.

This will be described below more concretely.

Figure 9:
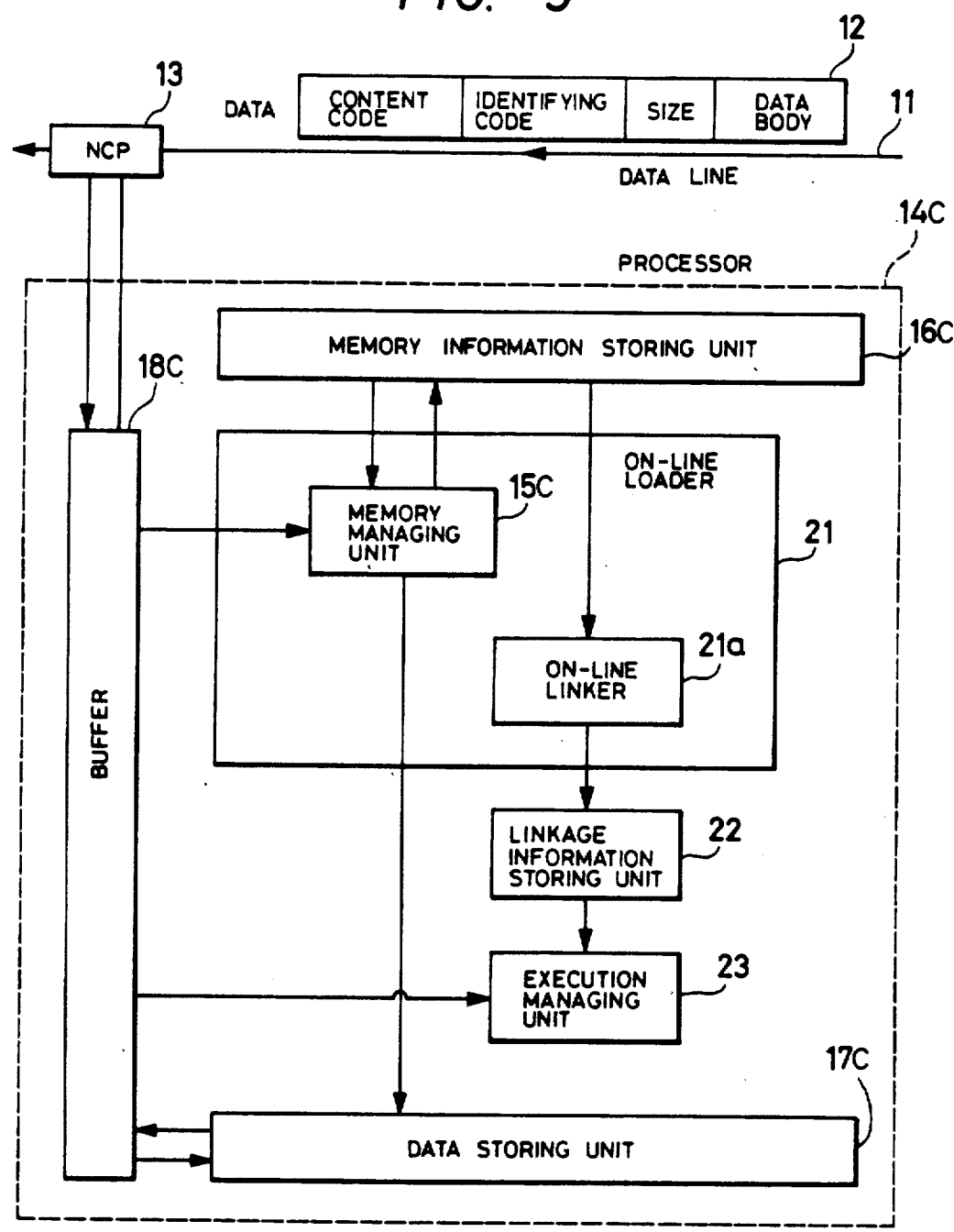
FIG. 9 is a diagram illustrating the structure of the processor employed in a data drive system utilizing the present invention.

FIG. 9 illustrates the case where the data drive system is adapted to the decentralized processing system of FIG. 2, and wherein reference numerals 11, 12 and 13 denote the same constituent elements as those mentioned earlier, and reference numerals 14C to 18C denote constituent elements that correspond to those denoted by 14A to 18A. That is, reference numeral 14C denotes a processor, and reference numerals 15C, 16C, 17C and 18C denote a memory managing unit, a memory information storing unit, a data storing unit and a buffer that constitute the processor.

The processor 14C is further provided with an on-line loader 21, a linkage information storing unit 22 and an execution managing unit 23. The on-line loader consists of the memory managing unit 15C and an on-line linker 21a. Further, the memory managing unit 15C may be comprised of either the memory managing unit 15A or the memory managing unit 15B described in the aforementioned embodiment, and is comprised of the latter in this case.

The processor 14 locates a suitable blank area, stores the input data 12, refers to the stored data, and executes the process. Here, however, the stored data is executed when it consists of a load module that can be relocated and when the above-mentioned required data is input.

FIG. 10 is a flow chart of the process that is executed by the processor 14C. The process executed by the processor 14C will now be described in conjunction with FIGS. 9 and 10.

The processor 14C drives the on-line loader 21 in response to data 12 input to the buffer 18c.

Figure 4:
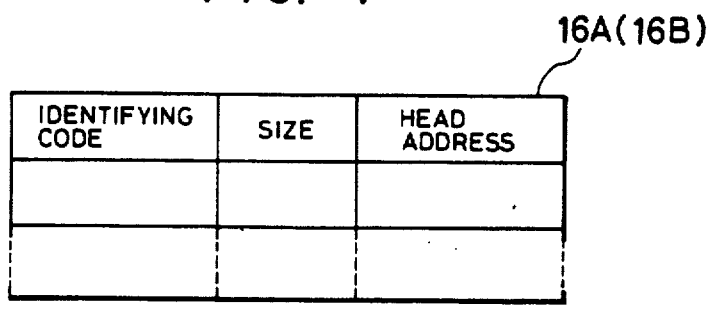
FIG. 4 is a diagram illustrating the format of a memory information storing unit of FIG. 3.
Figure 5:
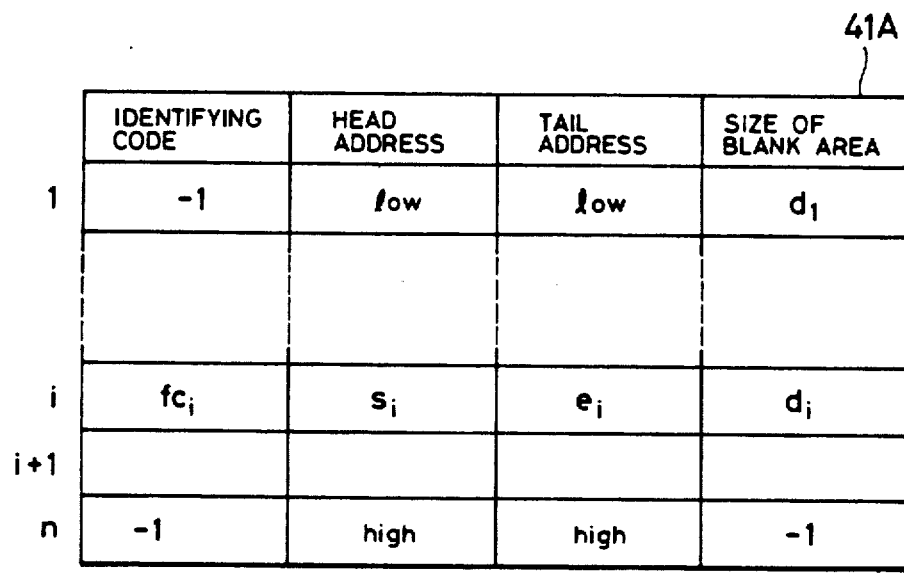
FIG. 5 is a diagram illustrating a format of a memory map.

The on-line loader 21 drives the memory managing unit 15C which forms the memory map (step 71), the same as the one shown in FIG. 4, based upon information in the memory information storing unit 16C and the upper/lower limit addresses (internal data) in the data storing unit 17C, in order to locate blank area in the data storing unit 17C. Then, based upon the memory map, a blank area of a size greater than the input data 12 is located and secured. At this time, the stored data may be relocated as required to eliminate wasteful blank area and to search and secure the blank area (step 72).

Next, if there are input data 12 and stored data that require relocation, information related thereto is registered in the memory information storing unit 16C or is renewed. Then, the stored data that needs relocation is relocated, and the input data 12 is stored in the data storing unit 17C (step 73).

Next, the on-line loader 21 drives the on-line linker 21a which manages the linkage information storing unit 22 such that the processor 14C refers to the stored data by the indirect reference system and executes it. FIG. 11 shows a format of the linkage information storing unit 22. The number of lines of the linkage information storing unit 22 is in agreement with that of the memory information storing unit 16C. The on-line linker 21a finds head addresses and content codes from the memory information storing unit 16C successively for all data that are stored in the data storing unit 17C, and renews the linkage information storing unit 22 (step 74).

The execution managing unit 23 searches the linkage information storing unit 22 for the required input data that are stored based upon the indirect reference system with the content code as a key, reads out the head address, refers to the stored data and drives it (step 75). The stored data that is driven processes the input data in the buffer 18C, adds the content code to the result and produces it onto the data field 11.

The above-mentioned structure can be modified as follows:

(1) In order to save steps related to the renewal of the linkage information storing unit 22, it may be included in the memory information storing unit 16C. This helps eliminate unnecessary tables and increase the processing speed of the on-line loader 21.

(2) The content code may be brought into agreement with the identifying code, and the process based upon the identifying code may be carried out by using the content code.

(3) The memory managing unit 15C may not have the relocation function (the one mentioned in the first embodiment).

According to the above-mentioned data drive system, the processor is provided with the memory control function that can be relocated, linkage function, and execution managing function, and locates a suitable blank area, stores the input data, refers to the stored data and executes it, contributing to improving on-line maintenance and extensibility of the system.

According to the present invention as described above, each processor stores the data received from the transmission medium in the blank area of its own memory using information that indicates the location of data stored in its own memory. It is therefore possible to provide a data processing system in which a processor stores data of variable lengths that can be relocated on the transmission medium in an on-line manner autonomously while locating and securing a suitable blank area.

Furthermore, each processor has the function of relocating data stored in the memory, and stores the data received from the transmission medium in the blank area of its own memory while relocating the data as required by the relocation function using information that indicates the relocation of data stored in the processor. In this case, therefore, the memory can be effectively utilized in addition to the above-mentioned effects.

What is claimed is:

1. A method of operating a decentralized processing system including a plurality of processors that are linked together through a data line that carries information blocks of varying length, with each information block including a data body and a size code indicating the size of the data body, and with each processor having a memory, said method comprising within each processor the steps of:
    (a) receiving information blocks carried on the data line;
    (b) detecting the size code of a received information block to determine the size of the data body of the received information block;
    (c) locating within the associated memory a blank area of a size sufficient for storing the data body of the received information block based upon the determined size of said data body and the location of data bodies already stored in said emory; and
    (d) storing the received data body in the located blank area of said memory.

2. A method of operating according to claim 1, further comprising relocating data bodies already stored in said memory to other areas within said memory to provide the blank area.

3. A method of operating according to claim 1 or 6, wherein the locating of the blank area comprises determining a tail address and a head address for data bodies already stored in said memory.

4. A method of operating according to claim 1 or 6 wherein said memory includes a memory map with identifying codes indicative of the identities of the already stored data bodies and the size of any blank area.

5. A method of operating according to claim 4, wherein said identifying code includes a content code indicative of the contents of the already stored data bodies.

6. A method of operating according to claim 1, wherein the data body of the received information block includes a program to be executed in the associated processor.

7. A method of operating according to claim 1, wherein:
    each information block further includes a content code indicating the contents of the data body;
    said method further comprises at each processor detecting the content codes of information blocks carried on the data line; and
    step (a) comprises receiving information blocks having content codes indicative of information blocks intended for the processor.

8. A method of loading a program of variable length in a decentralized processing system having a plurality of processors each of which has a memory and a transmission medium connecting said processors for transmitting information including said program and a size code indicating the length of the program, said method comprising at each processor the steps of:
    (a) receiving information from said transmission medium;
    (b) detecting the size code in the received information to determine the length of the program;
    (c) locating in the associated memory a blank area of a size sufficient for storing the program based on memory information about said associated memory and the length of said program; and
    (d) storing said program in the located blank area.

9. A method of loading a program according to claim 8, further including relocating programs already stored in aid associated memory to other areas in said associated memory to provide the blank area.

10. A method of loading a program according to claim 8 or 9, wherein said received information includes an identifying code identifying at least one program already stored in said associated memory.

11. A method of loading a program according to claim 8, wherein:
    said received information includes a content code indicating the content of the program;
    said method further comprises at each processor detecting the content code of information transmitted on said transmission medium; and
    step (a) comprises receiving information having a content code indicative of a program for that processor.

12. A method of operating a decentralized processing system including a plurality of processors that are linked together through a data line, with each processor having a memory, said method comprising steps of:

transmitting information, including at least one information block having a variable length and having a size code indicating the length of said information block and a content code indicating the contents of the information block, from a processor to said data line;

at each processor detecting the content code of each information block on said data line;

receiving at each processor transmitted information having a content code indicative of an information block for that processor;

detecting the size code of a received information block to determine the length of the received information block;

locating within the memory of each processor a blank area of a size sufficient for storing an information block received by that processor, based upon the size of the received information block and a memory map representing the location of information already stored in said memory; and storing the received information block in the located blank area of said memory.

* * * * *